Figure 1:
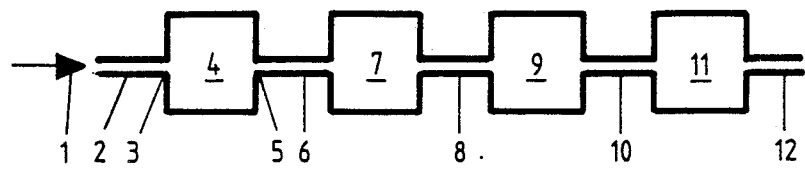

United States Patent [19]

Van Camp et al.

[11] Patent Number: 4,959,085
[45] Date of Patent: Sep. 25, 1990

[54] PROCESS AND INSTALLATION FOR THE TREATMENT OF A STREAM OF GAS CONTAINING PYROPHORIC DUST

[75] Inventors: Maurits C. Van Camp, Mortsel; Philippe M. Wattel, Berchem; André L. Delvaux, Wilrijk, all of Belgium

[73] Assignee: Metallurgie Hoboken-Overpelt, Hoboken, Belgium

[21] Appl. No.: 313,512

[22] Filed: Feb. 22, 1989

[30] Foreign Application Priority Data

Mar. 9, 1988 [BE] Belgium .............. 08800257

[51] Int. Cl.⁵ ............................ B01D 47/06
[52] U.S. Cl. ......................... 55/72; 55/97; 55/237; 55/261; 55/267
[58] Field of Search ............ 55/72, 97, 222, 235–237, 55/261, 267–269

[56] References Cited

U.S. PATENT DOCUMENTS

| | | | |
|---|---|---|---|
| 2,792,074 | 5/1957 | Schilb et al. | 55/97 X |
| 3,173,980 | 3/1965 | Hysinger | 55/261 X |
| 3,199,269 | 8/1965 | Oehlrich et al. | 55/261 |
| 3,668,833 | 6/1972 | Cahill, Jr. | 55/97 X |
| 3,727,378 | 4/1973 | Zirnqibl et al. | 55/72 |
| 3,789,109 | 1/1974 | Lyon et al. | 55/222 X |
| 4,010,246 | 3/1977 | Steinrötter et al. | 55/72 X |
| 4,035,169 | 7/1977 | Sebenik et al. | 55/72 X |
| 4,042,667 | 8/1977 | Ishiwata et al. | 55/97 X |
| 4,283,223 | 8/1981 | Billard | 55/72 X |
| 4,478,798 | 10/1984 | Karwat | 55/72 X |
| 4,533,384 | 8/1985 | Rellermeyer et al. | 264/125 |
| 4,645,184 | 2/1987 | Rellermeyer et al. | 266/81 |

FOREIGN PATENT DOCUMENTS

| | | |
|---|---|---|
| 0097292 | 1/1984 | European Pat. Off. . |
| 708282 | 7/1941 | Fed. Rep. of Germany . |
| 1268636 | 5/1968 | Fed. Rep. of Germany . |
| 2375562 | 7/1978 | France . |
| 1042779 | 9/1983 | U.S.S.R. .............. 55/97 |

OTHER PUBLICATIONS

H. S. Godsey, Air Poll. Contr. Assoc. Conf., The User and Fabric Filtration Equipment, USA, pp. 122–134, Oct. 1973.

*Primary Examiner*—Robert Spitzer
*Attorney, Agent, or Firm*—Fred Philpitt

[57] ABSTRACT

A stream of gas containing pyrophoric dust and oxyen is passed through a chamber that is equipped at the inlet with burners and sprinklers the operation of which is controlled in such a way that the stream of gas has for at least 1 second a temperature of at least 270° and that the temperature of the stream of gas does not exceed 500° C. Thereby the pyrophoric dust, that is present in the stream of gas is oxidized whereby is looses its pyrophoric character. The stream of gas is thus optimally conditioned to be filtered in a bag filter installation.

23 Claims, 1 Drawing Sheet

PROCESS AND INSTALLATION FOR THE TREATMENT OF A STREAM OF GAS CONTAINING PYROPHORIC DUST

The present invention relates to a process for treating a stream of gas containing oxygen and pyrophoric dust, according to which the stream of gas is sent through a bag filter and previously measures are taken to prevent that the bag filter would be damaged by burning dust.

Such process is known through the paper "Application of fabric filters to lead and zinc smelters", R. S. Godsey, Air Poll. Contr. Assoc. Conf. "The user and fabric filtration equipment", U.S.A. Oct. 1973; pp. 122-134. According to this known process the stream of gas to be treated is a gas that is exhausted at the top of a lead blast furnace and the following measures are taken to prevent that the bag filter would be damaged by burning dust:

- the gas is conducted from the blast furnace to the baghouse through an enormously large conduit-pipe (1.5 m wide and 4.2 m high), whereby a part of the pyrophoric dust, which is carried by the gas, gets the opportunity to deposit and so never reaches the baghouse;
- an inert material such as hydrated lime or gypsum is injected into the conduit-pipe to make the dust, that is carried by the gas, less pyrophoric;
- in the baghouse a large distance is provided between, on the one hand, the bag filters and, on the other hand, the floor over which the bag filters are suspended and on which the dust, that has been retained by the bag filters, is collected;
- the dust collected on the floor is ignited each day by means of a piece of burning coke to prevent that there, under the bag filters, large quantities of combustible material would accumulate.

This known process has the following drawbacks:
- it requires a very large conduit-pipe, which causes large investment- and maintenance costs;
- it gives rise to unhygienic working circumstances when cleaning the conduit-pipe;
- it requires the addition of inert material, which not only increases the operation costs, but also results in that the collected flue dust is diluted with that inert material; it is, moreover, complicated to determine the quantity of inert material to be added and the injection as such can also lead to problems;
- it requires the construction of a tall baghouse, the dust collecting part of which shall moreover be made of refractory material, which causes high investment costs too.

The aim of the present invention is to provide a process as defined before, that enables to avoid the drawbacks of the known process.

According to the invention said measures consist of continuously taking care that the stream of gas shall have for at least 1 second a temperature of at least 270° C., while keeping the temperature of the stream of gas below 500° C.

On the one hand, by continuously taking care that the stream of gas shall have for at least 1 second a temperature of at least 270° C., the pyrophoric dust, that is present in the stream of gas, is oxidized thereby losing its pyrophoric character, so that the injection of inert material has become completely superfluous and the dimensions of the conduit-pipe and the baghouse can be strongly reduced. On the other hand, by keeping meanwhile the temperature of the stream of gas below 500° C., one avoids that the oxidized material would melt or become sticky and so produce crusting in the installation in which the stream of gas is treated; one also avoids thereby that expensive refractory materials must be used for the construction of said installation.

It should be noted here that the abovementioned publication on page 128, paragraph 2, states the following:

"Experience at this plant indicates that if the furnace offgases are controlled to under 500° F. (260° C.), the metallic lead and zinc content will be high and the baghouse dust more combustible. Operating at temperatures over 500° F. (260° C.), the metallics oxidize and reduce the quantity of lime required to control the burning rate".

It is clear that it cannot be deduced herefrom that it is sufficient to continuously take care that the gas shall have for 1 second a temperature of 270° C. to oxidize the metallic (pyrophoric) dust, which it contains, in such a way that addition of lime becomes superfluous. Thus, said state of art points by no means in the direction of the process according to the invention.

In the process of the invention it is recommendable to give the stream of gas for at least 2 seconds a temperature of at least 300° C. to achieve an optimum operation security. It is also recommendable to keep the temperature of the stream of gas below 400° C., which makes it possible to build the installation, in which the stream of gas is treated, in a cheap sort of steel.

The process of the invention is particularly interesting for treating gases, which are exhausted from blast furnaces in which nonferrous metals, such as lead and copper, are recovered, as these gases have generally already a temperature of 100° to 150° C. and contain, moreover, fuel under the form of carbon monoxide, so that only little energy must be added to give them for the prescribed time the prescribed temperature.

The present invention also relates to an installation for treating a stream of gas containing oxygen and pyrophoric dust, including
- a cooling apparatus;
- a bag filter apparatus;
- a conduit-pipe to bring the stream of gas to the cooling apparatus;
- a conduit-pipe to bring the stream of gas from the cooling apparatus to the bag filter apparatus; and
- means to prevent that the bag filters of the bag filter apparatus would be damaged by burning dust.

Such an installation is known through the beforementioned publication. In this known installation the means to prevent that the bag filters would be damaged by burning dust consist, on the one hand, of the large dimensions of the conduit-pipes and of the bag filter apparatus and, on the other hand, of devices for injecting inert material into the conduit-pipes. This known installation has thus the drawback to cause high investment- and maintainance costs and it does, moreover, not allow to carry out the process of the invention as defined before.

The installation according to the invention, which allows to carry out the process of the invention and to avoid the drawbacks of the known installation, is characterized in that the said means comprise a chamber with separate in- and outlet, the outlet being connected with the conduit-pipe, which brings the stream of gas to the cooling unit, and the inlet being connected with a conduit-pipe, which leads to the origin of the stream of gas, the chamber being equipped at the inlet with heating means, which are suited to treat the gas flowing into the chamber in such a way that said gas has for at least 1 second a temperature of at least 270° C., and the chamber being also equipped with cooling means, which are suited to keep the temperature of the stream of gas in the chamber below 500° C.

Other details and characteristics of the invention will appear from the hereafter following description of an embodiment of the process and installation according to the invention, given by way of non-restrictive example and with reference to the enclosed drawings.

Figure 2:
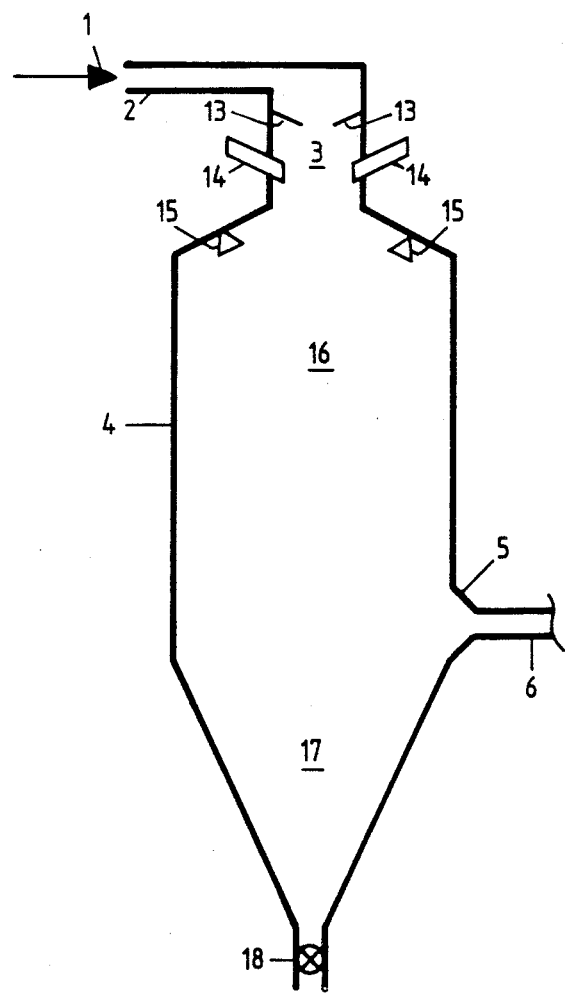

In these drawings:

FIG. 1 represents an elementary scheme of the installation according to the invention and FIG. 2 gives more detailed and in vertical section a part of the installation of FIG. 1.

In these drawings the same reference notations indicate identical elements.

A stream of gas 1 to be treated, which is originated when exhausting the furnace gas of a lead blast furnace, contains pyrophoric dust (Pb, Cd and various sulphides) and about 8.5% of CO; it also contains oxygen, since during the exhaustion of the furnace gas false (parasitic) air is exhausted too. The stream of gas 1 has usually a temperature of 100°-150° C. The stream of gas 1, that is moved on by a non-represented fan, is brought via conduit-pipe 2 into the inlet 3 of chamber 4, then into the chamber 4 itself and next via the outlet 5 of chamber 4 and via conduit-pipe 6 to cooling apparatus 7, from which it is conducted via conduit-pipe 8 to bag filter apparatus 9. After passage through the bag filter apparatus 9, the stream of gas 1 arrives via conduit-pipe 10 into afterburning unit 11, from which it is carried off to a non-represented chimney via conduit-pipe 12.

In inlet 3 of chamber 4 blades 13 are provided to give stream of gas 1 turbulence, whereby a good mixing is obtained between the furnace gas itself, that is present in stream of gas 1, and the false air that was exhausted together with the furnace gas.

Into inlet 3 of chamber 4 two gas- or fuel burners 14 debouch, the operation of which is controlled by known and not-represented temperature control means, which measure the temperature of the stream of gas 1 upstream and downstream of burners 14, among others at outlet 5 of chamber 4, and which control the burners in such a way that stream of gas 1 during its passage through chamber 4 has for at least two seconds, for instance for three seconds, a temperature of about 300° C. Hence, chamber 4 is designed in such a way that stream of gas 1 can remain in it for at least two seconds. The dust in stream of gas 1, which leaves chamber 4, is essentially completely oxidized and no longer pyrophoric, whereas the CO-content of the stream of gas is decreased only to about 5%.

Now it may happen sometimes that, when heating up to 300° C. a stream of gas such as stream of gas 1, which contains oxygen and carbon monoxide a chain reaction occurs whereby the stream of gas is ignited and temperatures exceeding 800° C. may be developed. This must certainly be avoided here and that is why water sprinklers 15 are provided at the top of the chamber, which start operating, when the temperature of stream of gas 1 at outlet 5 of chamber 4 remains higher than wanted, for instance higher than 350° C. Sprinklers 15 start, moreover, also operating when for any reason, for instance as a result of the emptying of the blast furnace, the temperature of the stream of gas 1 to be treated rises too high, for instance to above 350° C. Of course, sprinklers 15 stop to operate, when at in- and outlet of chamber 4 the wanted temperatures are reached.

Chamber 4, the part of which above the level of outlet 5 thus forms a heat treatment zone 16, is provided under the level of outlet 5 with a conical part 17, that forms a settling zone, in which the heavier dust particles, which are carried along by the stream of gas such as e.g. hot coke particles, have the opportunity to settle and from which the collected material can be removed through lock 18.

The stream of gas that is carried through pipe 6 to the cooling apparatus 7 known in itself, is thus free from pyrophoric dust and coarse dust and has a temperature of about 300° C. In cooling apparatus 7, for instance a heat exchanger in which the stream of gas is used to heat the blast furnace wind, the stream of gas is cooled to a temperature which is as low as possible but above the dew point of the gas, e.g. to 80° C. The stream of gas is now optimally conditioned to be filtered in the bag filter apparatus 9, whereafter it is optimally conditioned to be afterburned in the afterburning apparatus 11 known in itself, in which the carbon monoxide and gaseous organic compounds, if present, are burnt at 800° C. or higher.

The cross section of conduit-pipe 2, 6 and 8 is chosen so that the stream of gas 1 has sufficient velocity to prevent that substantial quantities of dust would deposit in said pipes. All solid materials from the stream of gas are thus essentially collected in the settling space 17 and in the bag filter apparatus 9, so that the conduit-pipes have to be cleaned only exceptionally.

The bag filter apparatus 9 is of a compact type, as there should no longer be provided a large distance between the bag filters and the floor like in the above discussed known installation. It is, moreover, completely built in a cheap non-refractory material, as there should also no longer be burnt any dust in it.

Many modifications can, of course, be made to the above described embodiment of the process and installation according to the invention without departing from the scope of the present invention.

So, other means than blades 13 can be used to give turbulence to the stream of gas. For instance, burners 14 can be mounted asymmetrically or conduit-pipe 2 can be made to debouch tangentially into outlet 3.

One can also operate with one burner instead of two, on condition of course that one chooses a burner which is powerful enough. One could also work of course with three or even more burners.

Instead of a direct heating with burner gases one could even use an indirect heating system. An indirect cooling system could also be installed instead of the sprinklers 15. These indirect systems would, however, entail an increase of investment and operation costs.

Instead of settling space 17 in the lower part of chamber 4 a cyclone separator could be installed between chamber 4 and cooling apparatus 7 or between the latter and bag filter apparatus 9. One could also install none of both, but the operation security would thereby suffer.

Neither is it necessary to near the dew point in cooling apparatus 7. For instance one could cool to 100° C. or 120° C., but the result thereof will be that the stream of gas which leaves the bag filter apparatus 2, becomes more rich in impurities, as the filtering took place at a higher temperature at which the impurities have a higher vapour pressure.

One can work without afterburning apparatus 11 or not at all provide this latter, when the composition of the stream of gas which leaves the bag filter apparatus is such that its direct discharge is not contrary to the legal regulations.

We claim:

1. A process for treating a stream of exhaust gas containing oxygen and pyrophoric dust, comprising the steps of
   (a) continuously taking care that the stream of exhaust gas shall be mixed with turbulence and have for at least 1 second a temperature of at least 270° C., while keeping the temperature of gas below 500° C., and
   (b) sending the stream of exhaust gas resulting from step (a) through a bag filter, step (a) being carried out prior to step (b).

2. A process according to claim 1, wherein the stream of gas is given for at least 2 seconds a temperature of at least 300° C.

3. A process according to claim 1, wherein the temperature of the stream of gas is kept below 400° C.

4. A process according to claim 1, wherein the stream of gas is given for at least 2 seconds a temperature of at least 300° C. and wherein the temperature of the stream of gas is kept below 400° C.

5. A process according to claim 1, wherein the stream of gas is sent through a heat treatment zone, at the inlet of which the stream of gas is heated.

6. A process according to claim 5, wherein the stream of gas is heated by injecting in it products of combustion from a burner.

7. A process according to claim 5, wherein at least at the outlet of the heat treatment zone the temperature of the stream of gas is measured and the heating at the inlet is adjusted in function of the temperature measured.

8. A process according to claim 7, wherein the stream of gas is cooled in the heat treatment zone, when its temperature at the outlet of this zone remains higher than wanted.

9. A process according to claim 8, wherein the stream of gas is cooled by sprinkling water in it.

10. A process according to claim 5, wherein the stream of gas is introduced into the heat treatment zone at the top thereof and is carried off therefrom laterally at the lower part.

11. A process according to claim 10, wherein the heat treatment zone below the level, where the stream of gas is carried off, is made to end in a settling zone, wherein a part of the dust is collected.

12. A process according to claim 1, wherein the stream of gas is given such a velocity between the source, where it is generated and the bag filter, that the dust is prevented from settling substantially, except in said settling zone.

13. A process according to claim 1, wherein a stream of gas is treated containing carbon monoxide and/or gaseous organic compounds and the stream of gas is burnt beyond the bag filter at at least 800° C.

14. A process according to claim 1, wherein a stream of gas is treated, that is exhausted from a blast furnace in which non-ferrous metals are recovered.

15. The process according to claim 1 wherein the exhaust gas from step (a) is cooled before being sent through said bag filter.

16. The process according to claim 1 wherein after the exhaust gas from step (a) is passed through said bag filter the resulting filtered gas is passed through an afterburning apparatus so as to burn carbon monoxide and gaseous organic compounds.

17. Installation for treating a stream of exhaust gas containing oxygen and pyrophoric dust, comprising
   a cooling apparatus,
   a bag filter apparatus,
   a conduit-pipe to bring the stream of gas to the cooling apparatus,
   a conduit-pipe to bring the stream of exhaust gas from the cooling apparatus to the bag filter apparatus, and
   means to prevent that the bag filters of the bag filter apparatus would be damaged by burning dust, said means comprising a chamber with separate in- and outlet, the outlet being connected with the conduit-pipe, which brings the stream of exhaust gas to the cooling apparatus, and the inlet being connected with a conduit-pipe, which leads to the origin of the stream of exhaust gas, the chamber being equipped at the inlet means to give turbulence to the incoming exhaust gas stream, and heating means which are suited to treat the exhaust gas flowing into the chamber in such a way that said exhaust gas has for at least 1 second a temperature of at least 270° C., the chamber being also equipped with cooling means which are suited to keep the temperature of the stream of exhaust gas in the chamber below 500° C.

18. Installation according to claim 17, wherein the heating means consist of at least one burner debouching into the inlet of the chamber.

19. Installation according to claim 17, wherein the cooling means consist of at least one water sprinkler.

20. Installation according to claim 17, wherein the inlet is located at the top of the chamber and the outlet at the side thereof.

21. Installation according to claim 20, wherein the chamber is equipped with a settling zone below the level of the outlet.

22. Installation according to claim 17, wherein the cross section of the beforementioned conduit-pipes is so small that such a velocity can be given to the stream of gas that the dust is prevented from settling substantially in the conduit-pipes.

23. Installation according to claim 17, wherein an afterburning apparatus is comprised, as well as a conduit-pipe to bring the stream of gas from the bag filter apparatus to said afterburning apparatus.

* * * * *

UNITED STATES PATENT AND TRADEMARK OFFICE
CERTIFICATE OF CORRECTION

PATENT NO. : 4,959,085
DATED : 9/25/90
INVENTOR(S) : VAN CAMP et al

It is certified that error appears in the above-identified patent and that said Letters Patent is hereby corrected as shown below:

COLUMN 6

Claim 17, line 31, insert --- with --- between "inlet" and "means".

Signed and Sealed this

Seventeenth Day of March, 1992

Attest:

HARRY F. MANBECK, JR.

*Attesting Officer*   *Commissioner of Patents and Trademarks*